United States Patent
Kirkpatrick

(10) Patent No.: US 9,194,447 B2
(45) Date of Patent: Nov. 24, 2015

(54) KEYED BRAKE DISK ASSEMBLY

(71) Applicant: Goodrich Corporation, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 183 days.

(21) Appl. No.: 14/076,666

(22) Filed: Nov. 11, 2013

(65) Prior Publication Data

US 2015/0129369 A1    May 14, 2015

(51) Int. Cl.
*F16D 55/36* (2006.01)
*F16D 65/12* (2006.01)
*B64C 25/42* (2006.01)
*F16D 55/40* (2006.01)
*F16D 69/04* (2006.01)
*F16D 55/00* (2006.01)
*F16D 65/02* (2006.01)

(52) U.S. Cl.
CPC .............. *F16D 65/12* (2013.01); *B64C 25/42* (2013.01); *F16D 55/36* (2013.01); *F16D 55/40* (2013.01); *F16D 65/122* (2013.01); *F16D 65/125* (2013.01); *F16D 65/126* (2013.01); *F16D 69/0408* (2013.01); *F16D 2055/0058* (2013.01); *F16D 2065/132* (2013.01); *F16D 2069/0433* (2013.01); *F16D 2069/0441* (2013.01); *F16D 2200/0052* (2013.01)

(58) Field of Classification Search
CPC ..... B64C 25/42; F16D 65/123; F16D 65/092; F16D 65/127; F16D 2065/1316; F16D 2065/132; F16D 2065/1356; F16D 55/36; F16D 65/12; F16D 65/122; F16D 65/126; F16D 2200/0052
USPC ........... 188/71.5, 18 A, 218 XL, 218 R, 73.1, 188/242, 243, 250 E
See application file for complete search history.

(56) References Cited

U.S. PATENT DOCUMENTS

| | | | | |
|---|---|---|---|---|
| 3,425,524 | A * | 2/1969 | Dewar | 188/218 XL |
| 3,613,851 | A * | 10/1971 | Ely et al. | 192/107 R |
| 3,747,712 | A * | 7/1973 | Stout | 188/73.2 |
| 4,511,021 | A | 4/1985 | Grider | |
| 5,558,186 | A * | 9/1996 | Hyde et al. | 188/218 XL |
| 5,709,288 | A | 1/1998 | Riebe | |
| 5,779,006 | A | 7/1998 | Hyde et al. | |
| 6,877,207 | B1 * | 4/2005 | Barnhardt | 29/558 |

(Continued)

FOREIGN PATENT DOCUMENTS

| EP | 0833071 | 4/1998 |
|---|---|---|
| EP | 2068032 | 6/2009 |

OTHER PUBLICATIONS

Office Action dated Jun. 15, 2015 in U.S. Appl. No. 13/927,963.

(Continued)

*Primary Examiner* — Pamela Rodriguez
(74) *Attorney, Agent, or Firm* — Snell & Wilmer, LLP

(57) ABSTRACT

Friction disks, such as rotors and stators, including floating cores are disclosed. The friction disks may include a carrier plate and a wear liner coupled to each side of the core. The floating core may be located between the wear liners. The floating core may include a key which is located within a key notch in the carrier plate. The key may prevent the floating core from rotating relative to the carrier plate.

15 Claims, 8 Drawing Sheets

(56) References Cited

U.S. PATENT DOCUMENTS

| | | | | |
|---|---|---|---|---|
| 7,543,691 B2* | 6/2009 | Hopkins et al. | ......... | 188/218 XL |
| 7,938,236 B2* | 5/2011 | Johnson | ................. | 188/218 XL |
| 8,281,907 B2* | 10/2012 | Fryska et al. | ........... | 188/218 XL |
| 2007/0175710 A1 | 8/2007 | Walker et al. | | |
| 2010/0000070 A1* | 1/2010 | La Forest et al. | .......... | 29/525.06 |
| 2013/0112514 A1 | 5/2013 | Hanna et al. | | |

OTHER PUBLICATIONS

European Search Report dated May 7, 2015 in European Application No. 14192562.8.

* cited by examiner

KEYED BRAKE DISK ASSEMBLY

FIELD

The present invention relates to aircraft braking systems. In particular, the invention relates to a brake disk assembly of an aircraft braking system.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. During high speed landings and rejected takeoffs ("RTOs"), the amount of heat generated can be enough to destroy friction disks made of formerly commonly used materials, such as steel. Carbon composite materials are better suited for high temperature use and are now the standard for friction disks in aircraft brake assemblies. However, carbon composite disks can be expensive to manufacture, especially ones having the thickness preferable for use on an aircraft. Interaction between friction disks and friction disk components may create vibrations which may create significant noise and/or reduce braking effectiveness.

SUMMARY

A friction disk is disclosed. The friction disk may comprise a carrier plate, a first wear liner, a second wear liner, and a floating core. The first wear liner may be coupled to the carrier plate. The second wear liner may be coupled to the carrier plate. The floating core may be located between the first wear liner and the second wear liner. The floating core may comprise a floating core key. The carrier plate may comprise a key notch. The floating core key may be located within the key notch.

An aircraft brake system is disclosed. The aircraft brake system may comprise a rotor. The rotor may comprise a rotor carrier plate, a first rotor wear liner, a second rotor wear liner, and a floating rotor core. The floating rotor core may be located between the first rotor wear liner and the second rotor wear liner. The aircraft brake system may comprise a stator. The stator may comprise a stator carrier plate, a first stator wear liner, a second stator wear liner, and a floating stator core. The floating stator core may be located between the first stator wear liner and the second stator wear liner.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Friction disks, including rotors and stators, including floating cores are disclosed. The friction disks may include a carrier plate, a floating core, and a replaceable wear liner coupled to each side of the carrier plate. The wear liners may include a plurality of keys which engage key notches in the carrier plate. The key notches may prevent the wear liners from rotating with respect to the carrier plate in response to a shear force, such as a force applied during braking. The floating core may include a plurality of keys which engage key notches in the carrier plate. The key notches may prevent the floating core from rotating with respect to the carrier plate.

Figure 1:
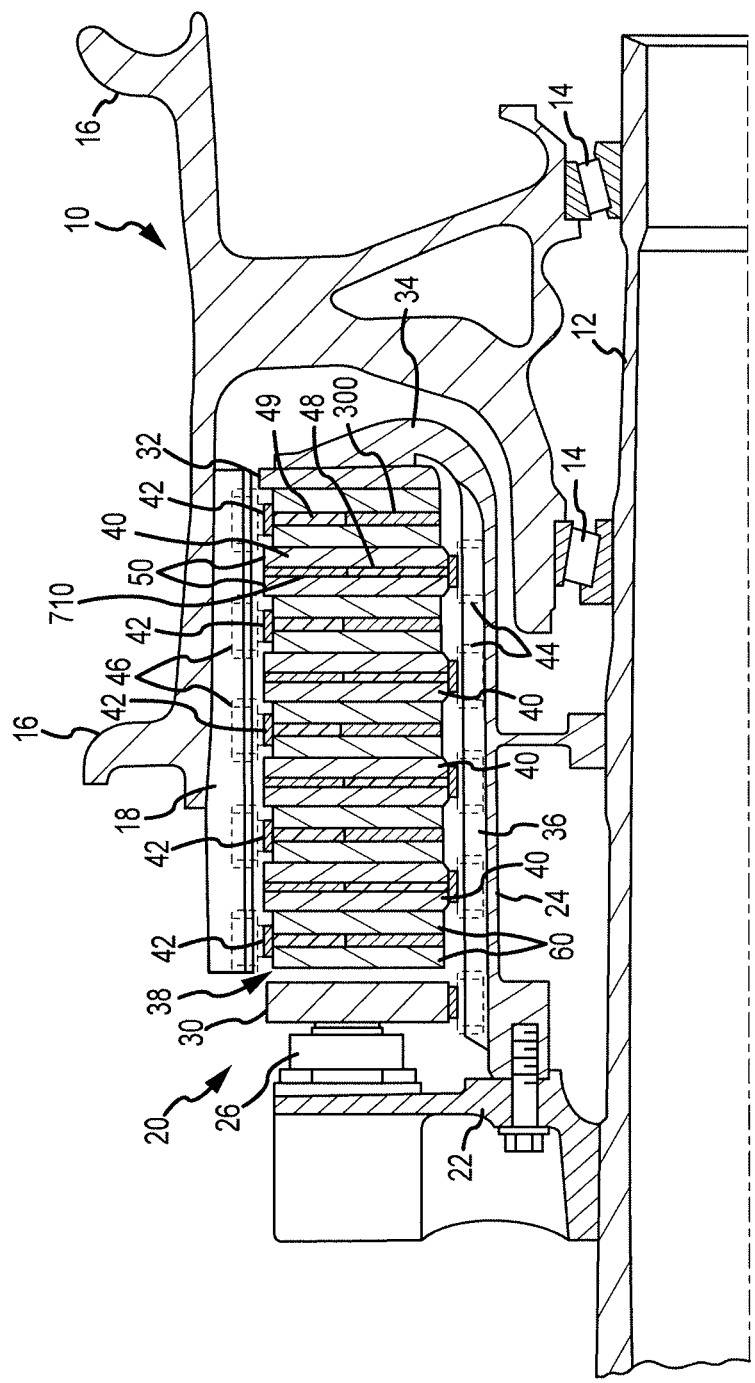
FIG. 1 illustrates, in accordance with various embodiments, a schematic view of a multi-disk brake.

Referring to FIG. 1, a multi-disk brake system 20 is illustrated according to various embodiments. The system may include a wheel 10 supported for rotation around axle 12 by bearings 14. Wheel 10 includes rims 16 for supporting a tire (not shown), and a series of axially extending rotor splines 18 (one shown). Rotation of wheel 10 is modulated by disk brake system 20. Disk brake system 20 includes torque flange 22, torque tube 24, a plurality of pistons 26 (one shown), pressure carbon disk 30, and end plate 32. Torque tube 24 is an elongated annular structure that includes reaction plate 34, and a series of axially extending stator splines 36 (one shown). Reaction plate 34 and stator splines 36 may be integral with torque tube 24 as shown in FIG. 1, or attached as separate components.

Disk brake system 20 also includes a plurality of friction disks 38. The plurality of friction disks 38 includes at least one non-rotatable friction disk 40, also known as a stator, and at least one rotatable friction disk 42, also known as a rotor. Non-rotatable friction disks 40 may comprise a stator carrier plate 48, a floating stator core 710 and stator wear liners 50.

Rotatable friction disks 42 may comprise a rotor carrier plate 49, a floating rotor core 300, and rotor wear liners 60. Each friction disk 38 includes an attachment structure. In the embodiment of FIG. 1, each of four non-rotatable friction disks 40 include a plurality of stator lugs 44 at circumferentially spaced positions around non-rotatable friction disk 40 as an attachment structure. Similarly, each of five rotatable friction disks 42 include a plurality of rotor lugs 46 at circumferentially spaced positions around rotatable friction disk 42 as an attachment structure. In the embodiment of FIG. 1, pressure carbon disk 30, end plate 32, and friction disks 38 are all annular structures made at least partially from a carbon composite material.

Torque flange 22 is mounted to axle 12. Torque tube 24 is bolted to torque flange 22 such that reaction plate 34 is near an axial center of wheel 10. End plate 32 is connected to a surface of reaction plate 34 facing axially away from the axial center of wheel 10. Thus, end plate 32 is non-rotatable by virtue of its connection to torque tube 24. Stator splines 36 support pressure carbon disk 30 so that pressure carbon disk 30 is also non-rotatable. Stator splines 36 also support non-rotatable friction disks 40. Non-rotatable friction disks 40 engage stator splines 36 with gaps formed between stator lugs 44. Similarly, rotatable friction disks 42 engage rotor splines 18 with gaps formed between rotor lugs 46. Thus, rotatable friction disks 42 are rotatable by virtue of their engagement with rotor splines 18 of wheel 10.

As shown in FIG. 1, rotatable friction disks 42 are arranged with end plate 32 on one end, pressure carbon disk 30 on the other end, and non-rotatable friction disks 40 interleaved so that rotatable friction disks 42 are adjacent to non-rotatable friction components. Pistons 26 are connected to torque flange 22 at circumferentially spaced positions around torque flange 22. Pistons 26 face axially toward wheel 10 and contact a side of pressure carbon disk 30 opposite rotatable friction disks 42. Pistons 26 may be powered electrically, hydraulically, or pneumatically.

Figure 2:
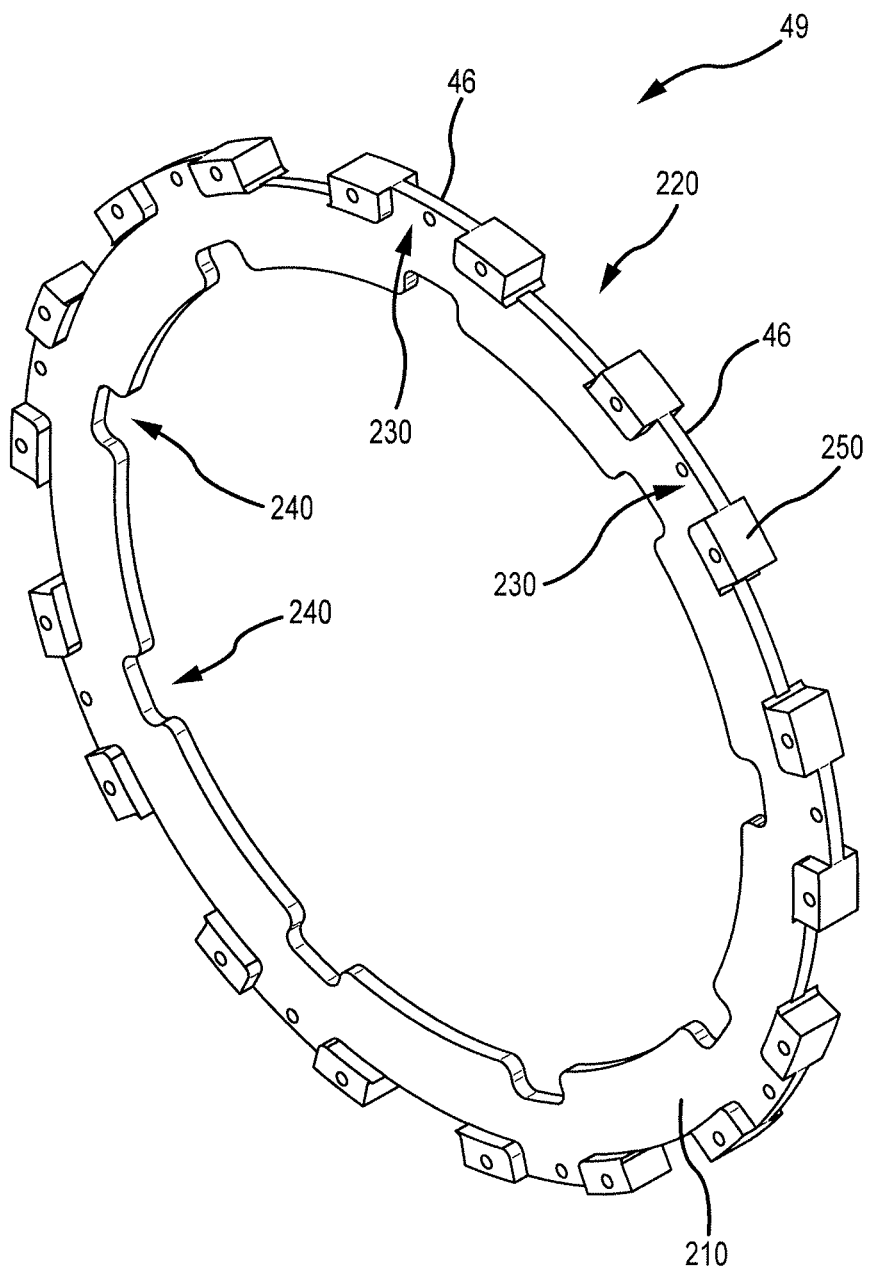
FIG. 2 illustrates, in accordance with various embodiments, a perspective view of a rotor carrier plate.

Referring to FIG. 2, a perspective view of a rotor carrier plate 49 is illustrated according to various embodiments. Rotor carrier plate 49 may comprise rotor spine 210 and rotor lugs 46. Rotor carrier plate 49 may engage rotor splines 18 in rotor gaps 220 formed between rotor lugs 46. Thus, rotor carrier plate 49 may be rotatable by virtue of the engagement between rotor lugs 46 and rotor splines 18 of wheel 10. In various embodiments the material of rotor carrier plate 49 may be selected for its structural properties. For example, rotor carrier plate 49 may comprise silicon carbide, a silicon carbide composite, or titanium. Rotor carrier plate 49 may further comprise rotor lug key notches 230. Rotor lug key notches 230 may be a recessed portion of rotor lugs 46. In the illustrated embodiment, rotor lug key notches 230 extend radially all the way through rotor lugs 46, such that rotor lugs 46 have a decreased thickness at rotor lug key notches 230. However, in various embodiments, rotor lug key notches 230 may only partially extend radially through rotor lugs 46, such that rotor lugs 46 comprise a substantially uniform thickness at an outer surface of rotor lugs 46.

In various embodiments, rotor spine 210 may comprise rotor spine key notches 240 at an inner circumference of rotor spine 210. Rotor spine key notches 240 may be configured to receive a floating core as further described with reference to FIG. 3. In various embodiments, rotor spine 210 may comprise a rotor spine key notch 240 corresponding to each rotor lug key notch 230. For example, in the illustrated embodiment, rotor carrier plate 49 comprises nine rotor lug key notches 230 and nine rotor spine key notches 240. However, in various embodiments, rotor spine 210 may comprise any number of rotor spine key notches 240.

Figure 3:
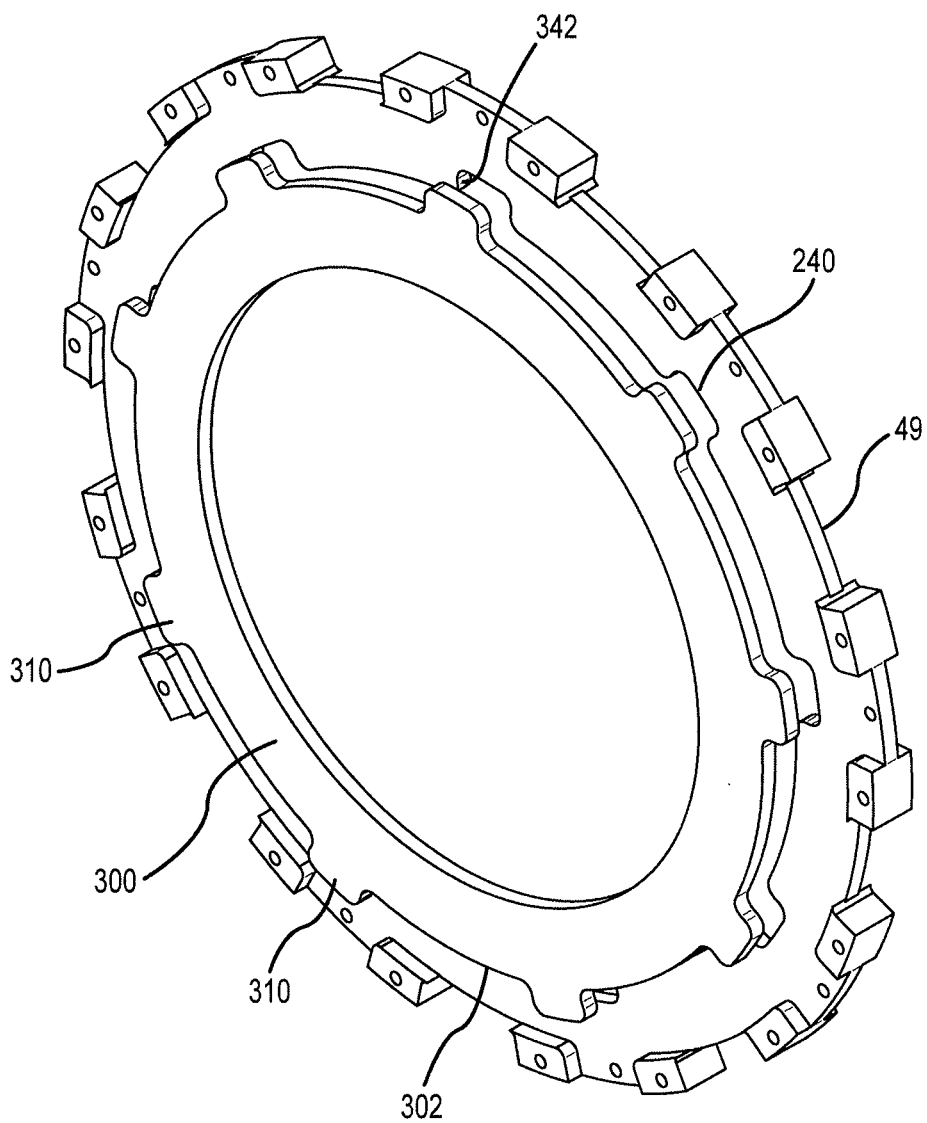
FIG. 3 illustrates, in accordance with various embodiments, a perspective view of a rotor carrier plate and a floating rotor core.

Referring to FIG. 3, a perspective view of a rotor carrier plate 49 and a floating rotor core 300 is illustrated according to various embodiments. Floating rotor core 300 may be located radially inward of rotor carrier plate 49. Floating rotor core 300 may comprise an annular component having floating rotor core keys 310 extending radially outward from an outer circumference 302 of floating rotor core 300. In various embodiments, each floating rotor core key 310 may correspond to a rotor spine key notch 240. Floating rotor core 300 may be positioned such that floating rotor core keys 310 fit within rotor spine key notches 240. Thus, floating rotor core keys 310 may contact lateral walls 342 of rotor spine key notches 240 and prevent relative rotational movement between floating rotor core 300 and rotor carrier plate 49. A material of floating rotor core 300 may be selected for its frictional and/or vibrational damping properties. In various embodiments, the material of floating rotor core 300 may be selected for its wear resistance, thermal conductivity, heat capacity, structural, and/or oxidation resistance properties. In various embodiments, floating rotor core 300 may comprise a carbon composite. Thus, rotor 42 may contain the structural advantages of rotor carrier plate 49, and the frictional advantages of floating rotor core 300.

Figure 4:
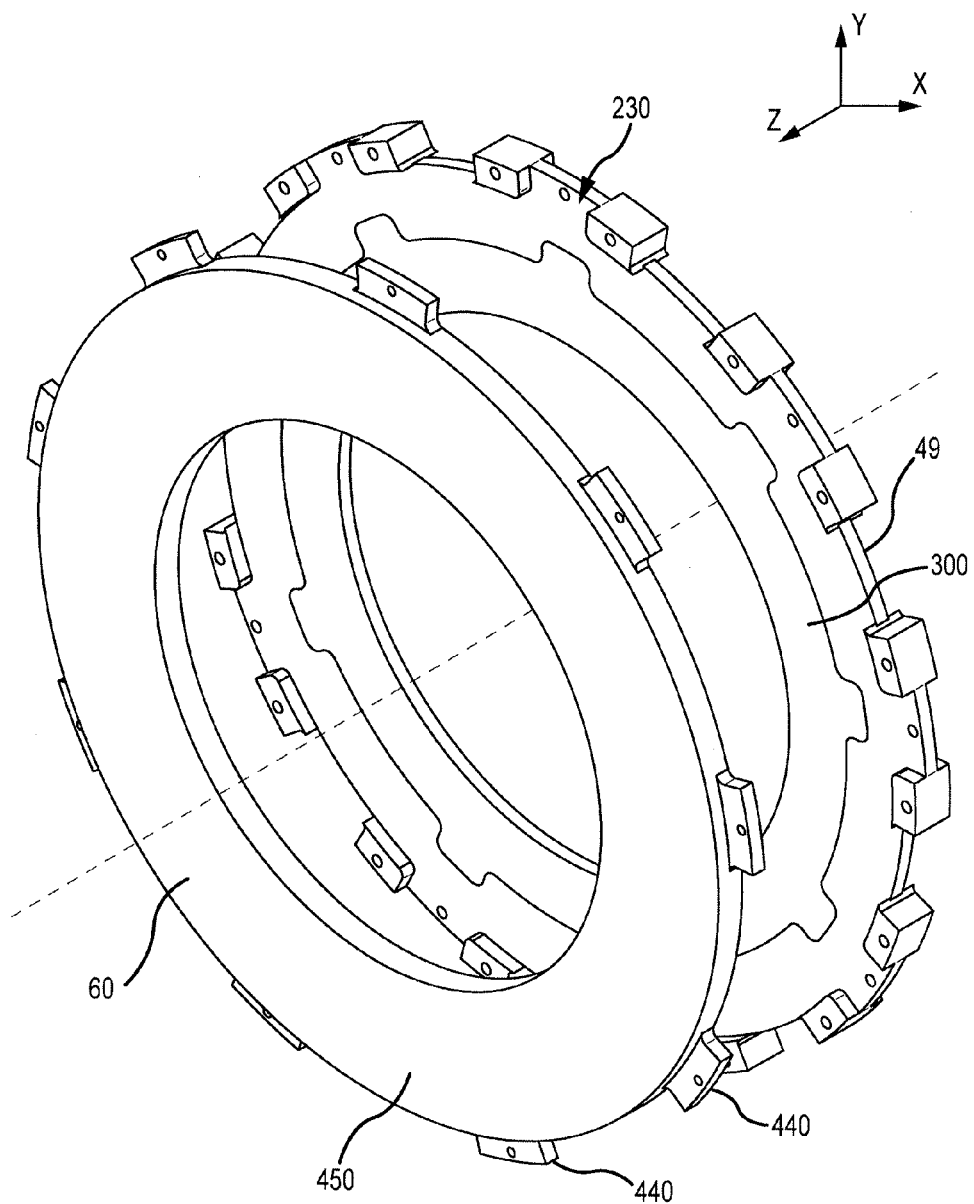
FIG. 4 illustrates, in accordance with various embodiments, a perspective view of a rotor carrier plate, a floating rotor core, and a rotor wear liner.

Referring to FIG. 4, a perspective view of a rotor carrier plate 49, a floating rotor core 300, and a rotor wear liner 60 is illustrated according to various embodiments. Rotor wear liner 60 may comprise rotor wear liner annular ring 450 and rotor wear liner keys 440. Rotor wear liner keys 440 may be sized and shaped to fit into rotor lug key notches 230. Rotor wear liner 60 may comprise any number of rotor wear liner keys 440. For example, in the illustrated embodiment, rotor wear liner 60 comprises nine rotor wear liner keys 440. However, in various embodiments, rotor wear liner 60 may comprise any number of rotor wear liner keys 440, for example, rotor wear liner 60 may comprise three rotor wear liner keys 440, or twenty rotor wear liner keys 440. In various embodiments, rotor wear liner keys 440 and rotor wear liner annular ring 450 may comprise a single continuous component. However, in various embodiments, rotor wear liner keys 440 may be coupled to rotor wear liner annular ring 450. As illustrated, rotor wear liner keys 440 may have a thickness in the axial, or "z" direction which is less than a thickness of rotor wear liner annular ring 450. However, in various embodiments, the thickness of rotor wear liner keys 440, may be substantially the same as or greater than the thickness of rotor wear liner annular ring 450. A material of rotor wear liners 60 may be selected for its frictional properties. For example, rotor wear liners 60 may comprise a carbon composite. Thus, rotor 42 may contain the structural advantages of rotor carrier plate 49, and the frictional advantages of rotor wear liners 60.

Figure 5:
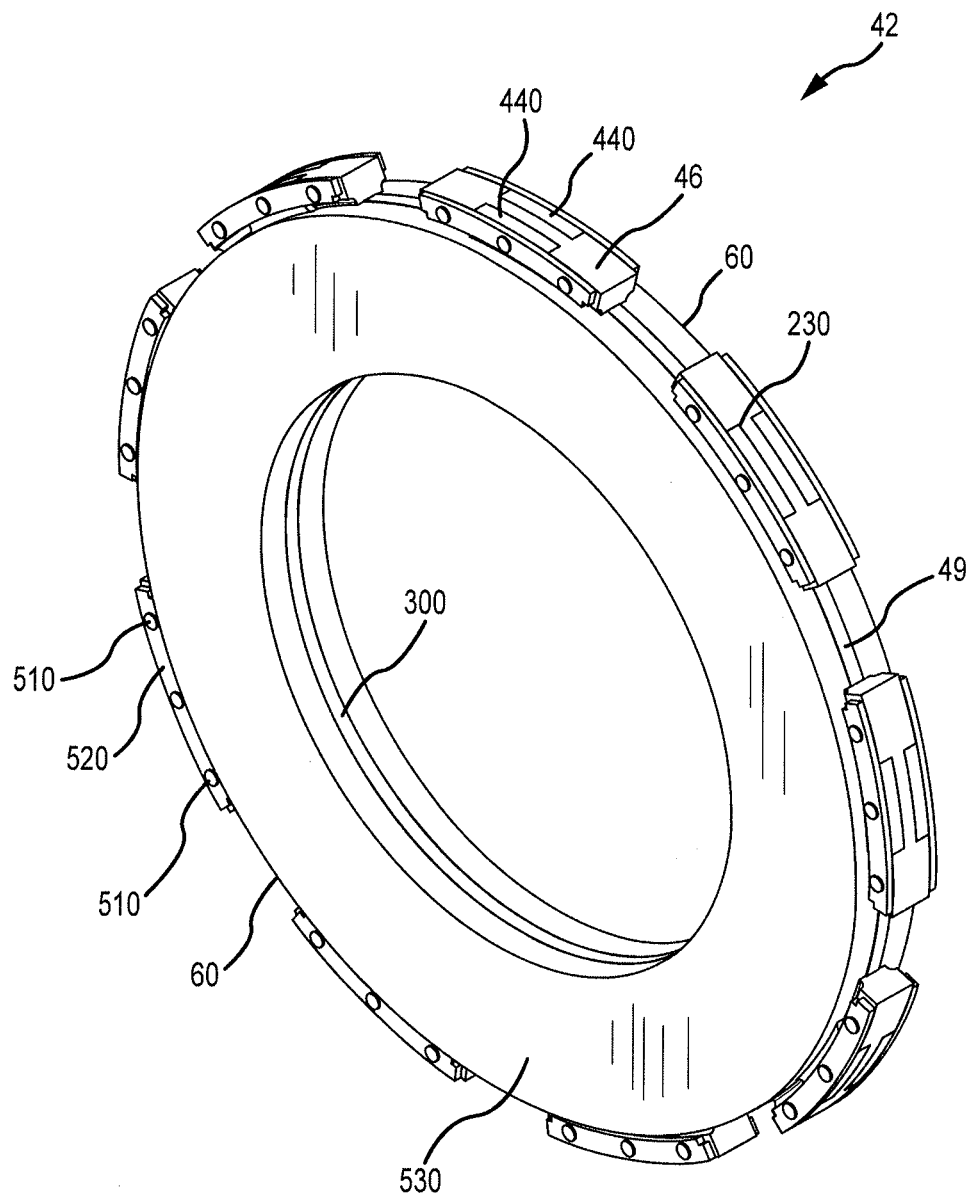
FIG. 5 illustrates, in accordance with various embodiments, an assembled rotor having a floating rotor core.

Referring to FIG. 5, an assembled rotor 42 is illustrated according to various embodiments. Rotor 42 comprises a floating rotor core 300, a rotor carrier plate 49, and a rotor wear liner 60 coupled to each side of rotor carrier plate 49 and floating rotor core 300. A mating surface of rotor wear liner 60 opposite a rotor wear surface 530 may be bonded to rotor carrier plate 49. In various embodiments, a bond may comprise an adhesive capable of maintaining adhesion under high temperatures, for example, between about 800° F. (about 426° C.) and 2,000° F. (about 1,093° C.), or between about 400° F. (about 204° C.) and 4,000° F. (about 2,204° C.). In addition, in various embodiments, an adhesive may be applied via chemical vapor deposition. In various embodiments, rotor wear liners 60 may be coupled to rotor carrier plate 49 by a plurality of rivets 510 and cover plates 520. The rivets 510 may extend through cover plates 520, rotor wear liner keys 440, and rotor lugs 46. In various embodiments, the rotor wear liner keys 440 may not be part of rotor wear surface 530 of the rotor wear liners 60. Thus, regardless, of how much the rotor wear liners 60 wear down, rivets 510 may not change the frictional properties of rotor 42.

During aircraft braking, a torque may be applied to rotor wear liners 60. The torque may cause a shear force that, in the absence of a counteracting force, acts to rotate rotor wear liners 60 relative to rotor carrier plate 49. However, rotor wear liner keys 440 may be located within rotor lug key notches 230 to engage rotor lugs 46. Contact between rotor wear liner keys 440 and rotor lugs 46 may counteract the torque, thus reducing the shear force, and may prevent rotor wear liners 60 from rotating relative to rotor carrier plate 49. In various embodiments, whether by design or due to manufacturing tolerances, small gaps may exist between rotor wear liner keys 440 and rotor lug key notches 230, resulting in rotor wear liners 60 rotating slightly relative to rotor carrier plate 49 prior to rotor wear liner keys 440 engaging rotor lugs 46. In various embodiments, although rotor wear liner keys 440 may prevent rotation of rotor wear liners 60, due to elastic material properties of rotor wear liners 60, rotor wear liners 60 may stretch in the direction of the torque due to the shear force. In various embodiments, distortion or small rotational movement of rotor wear liners 60 may be transferred to floating rotor core 300. Frictional forces between rotor wear liners 60 and floating rotor core 300 may cause floating rotor core 300 to distort or rotate slightly within rotor spine key notches 240.

Figure 6:
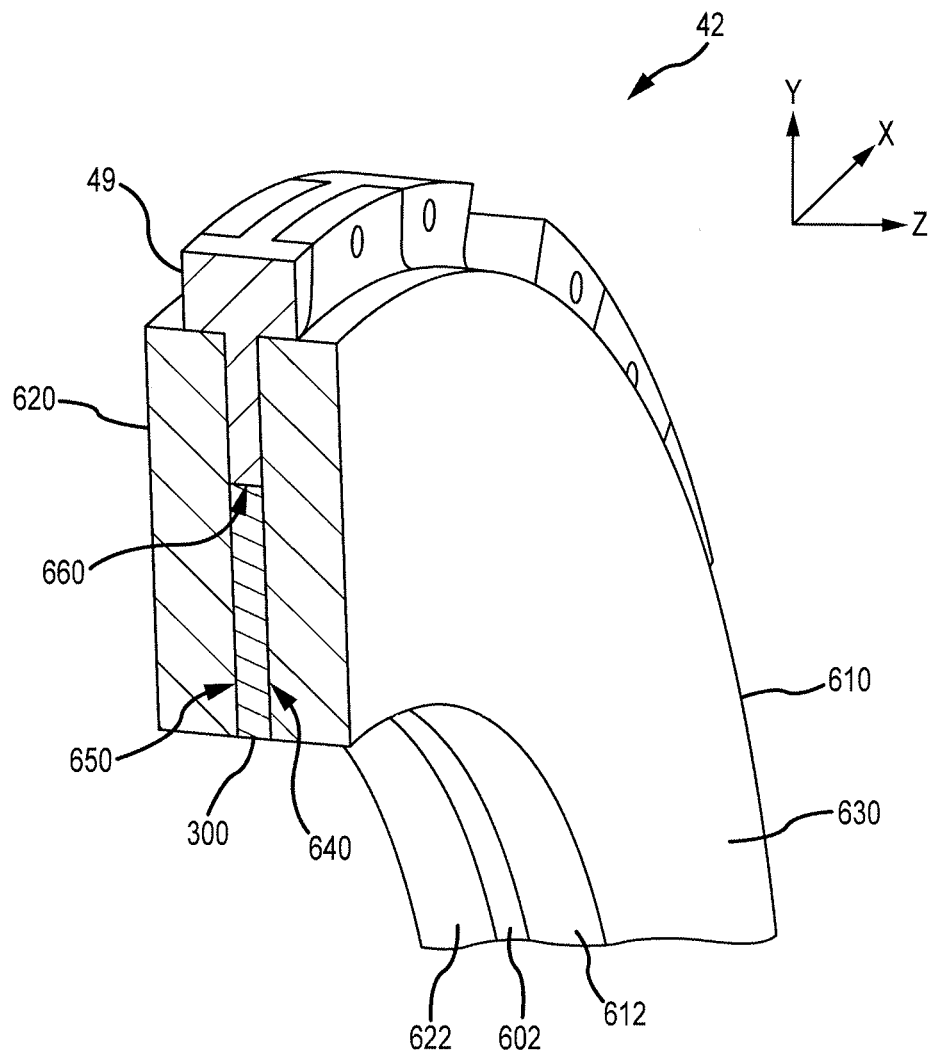
FIG. 6 illustrates, in accordance with various embodiments, a cutaway view of a rotor having a floating rotor core.

Referring to FIG. 6, a cutaway view of rotor 42 is illustrated according to various embodiments. Rotor 42 may comprise rotor carrier plate 49, floating rotor core 300, first rotor wear liner 610 and second rotor wear liner 620. In various embodiments, an inner surface 602 of floating rotor core 300 may be flush with an inner surface 612 of first rotor wear liner 610 and an inner surface 622 of second rotor wear liner 620. However, in various embodiments, inner surface 602 of floating rotor core 300 may be offset (i.e. not flush) with inner surface 612 of first rotor wear liner 610 and inner surface 622 of second rotor wear liner 620. In various embodiments, floating rotor core 300 may damp vibrations in rotor 42. During braking, a torque may be applied to first rotor wear surface 630. The torque may create vibrations in first rotor wear liner 610. The vibrations may be transferred through first rotor wear liner 610 to floating rotor core 300, and to second rotor wear liner 620.

However, in various embodiments, floating rotor core 300 may damp the vibrations. Floating rotor core 300 may be located between first rotor wear liner 610 and second rotor wear liner 620. However, in various embodiments, floating rotor core 300 may not be fastened to any of the other components of rotor 42. Thus, floating rotor core 300 may be free to move slightly in the axial direction (z-direction) between first rotor wear liner 610 and second rotor wear liner 620. Slight slippage between first rotor wear liner 610, floating rotor core 300, and second rotor wear liner 620 may provide a mechanism for damping the vibrations. The amplitude of the vibrations being transferred from first rotor wear liner 610 to floating rotor core 300 may therefore be decreased at a first interface 640 between first wear liner 610 and floating rotor core 300. Similarly, the amplitude of the vibrations being transferred from floating rotor core 300 to second wear liner 620 may be decreased at a second interface 650 between floating rotor core 300 and second wear liner 620. Additionally, vibrations being transferred from floating rotor core 300 to rotor carrier plate 49 may be damped at the interface 660 between floating rotor core 300 and rotor carrier plate 49. In various embodiments, floating rotor core 300 may comprise grooves or recesses at first interface 640 and/or second interface 650 such that a portion of floating rotor core 300 does not contact first wear liner 610 at first interface 640 and/or second wear liner 620 at second interface 650.

Figure 7:
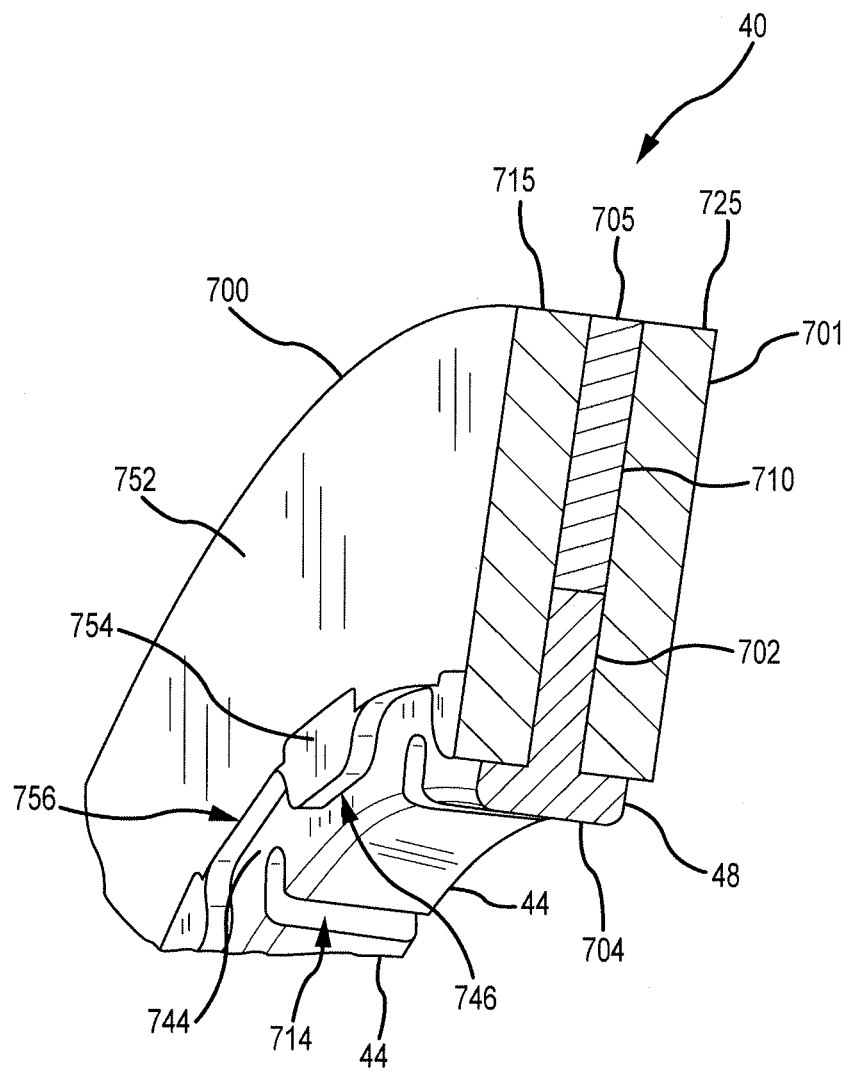
FIG. 7 illustrates, in accordance with various embodiments, a cutaway view of a stator having a floating stator core.

Referring to FIG. 7, a cutaway view of a stator 40 is illustrated according to various embodiments. Stator 40 may comprise a stator carrier plate 48, floating stator core 710, first stator wear liner 700, and second stator wear liner 701. In various embodiments, an outer surface 705 of floating stator core 710 may be flush with an outer surface 715 of first stator wear liner 700 and an outer surface 725 of second stator wear liner 701. However, in various embodiments, outer surface 705 of floating stator core 710 may be offset (i.e. not flush) with outer surface 715 of first stator wear liner 700 and outer surface 725 of second stator wear liner 701. Stator carrier plate 48, first stator wear liner 700, and second stator wear liner 701 may comprise different materials. For example, in various embodiments, stator carrier plate 48 may comprise steel, and first stator wear liner 700 and second stator wear liner 701 may comprise a carbon composite. However, in various embodiments, stator carrier plate 48, first stator wear liner 700, and second stator wear liner 701 may comprise the same material, such as a carbon composite. In various embodiments, the material of stator carrier plate 48 may be selected for its structural properties. For example, stator carrier plate 48 may comprise silicon carbide, a silicon carbide composite, or titanium. A material of first stator wear liner 700 and second stator wear liner 701 may be selected for its frictional properties. In various embodiments, the material of first stator wear liner 700 and second stator wear liner 701 may be selected for its wear resistance, thermal conductivity, heat capacity, structural, and/or oxidation resistance properties. Thus, stator 40 may contain the structural advantages of stator carrier plate 48, and the frictional advantages of first stator wear liner 700 and second stator wear liner 701.

Stator carrier plate 48 may comprise stator spine 702 and inner core 704. Inner core 704 may comprise stator lugs 44. Inner core 704 may further comprise gaps 714 between an inner portion of stator lugs 44. Gaps 714 may be located to align with stator splines 36. The engagement between the stator splines 36 and stator lugs 44 prevents stator 40 from rotating when a torque is applied to stator 40 during braking. Stator carrier plate 48 may further comprise stator carrier plate keys 744 and stator carrier plate key notches 746 located at an outer portion of stator lugs 44. In various embodiments, stator carrier plate keys 744 may extend radially from an outer portion of inner core 704. Stator carrier plate key notches 746 may be a recess between stator carrier plate keys 744, and/or a recess in an outer portion of inner core 704.

First stator wear liner 700 and second stator wear liner 701 may be located adjacent to stator carrier plate 48 and floating stator core 710. As illustrated, first stator wear liner 700 and second stator wear liner 701 may be located adjacent to opposite sides of stator spine 702 and floating stator core 710. Floating stator core 710 may be located between first stator wear liner 700 and second stator wear liner 701 and radially outward of stator carrier plate 48. In various embodiments, first stator wear liner 700 and second stator wear liner 701 may be coupled to stator carrier plate 48. First stator wear liner 700 and second stator wear liner 701 may be coupled to stator carrier plate 48 by, for example, a bond or by mechanical fastening such as riveting. In various embodiments, first stator wear liner 700 and second stator wear liner 701 are not fastened to stator carrier plate 48, and first stator wear liner 700 and second stator wear liner 701 are kept in place by contact from adjacent components, such as rotor wear liners 60. First stator wear liner 700 and second stator wear liner 701 may comprise stator wear liner annular ring 752 and stator wear liner keys 754. In various embodiments, first stator wear liner 700 and second stator wear liner 701 may comprise a substantially uniform thickness. However, in various embodiments, stator wear liner keys 754 may have a thickness which is greater than or less than a thickness of stator wear liner annular ring 752. In various embodiments, stator wear liner keys 754 may be sized and shaped to mate with stator carrier plate key notches 746. In various embodiments, stator carrier plate keys 744 may be sized and shaped to mate with wear liner key notches 756. Similarly to floating rotor core 300, in various embodiments, floating stator core 710 may damp vibrations in stator 40. In various embodiments, floating stator core 710 may comprise grooves or recesses at interfaces with first stator wear liner 700 and/or second stator wear liner 701 such that a portion of floating stator core 710 does not contact first stator wear liner 700 and/or second wear liner 701 at the interfaces.

Figure 8:
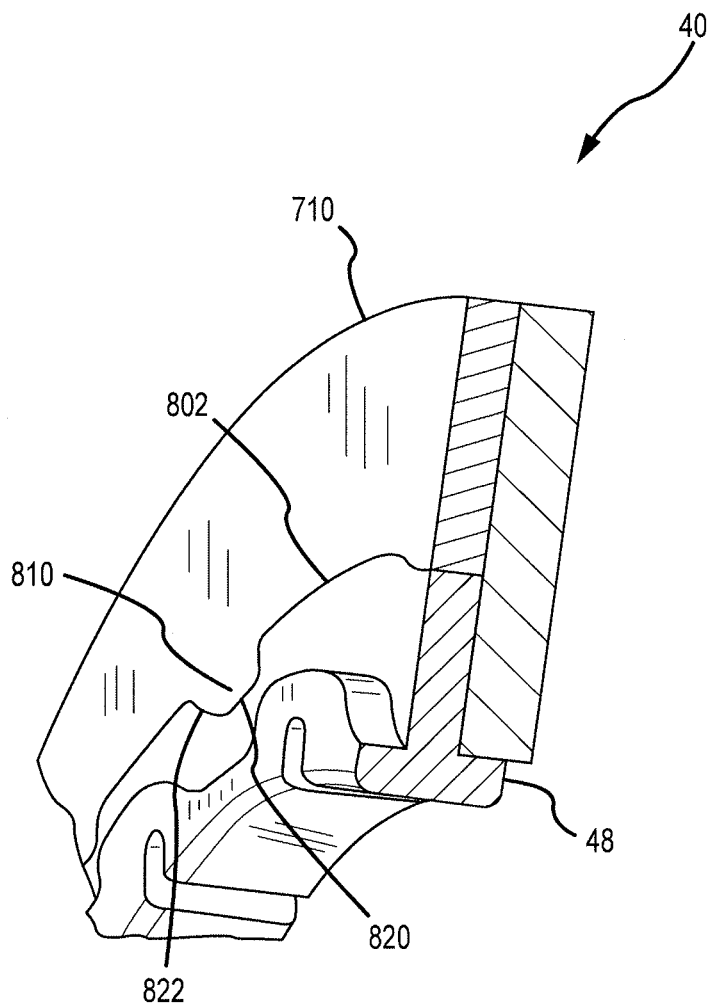
FIG. 8 illustrates, in accordance with various embodiments, a cutaway view of a stator having a floating stator core with a stator wear liner removed from view.

Referring to FIG. 8, a cutaway view of a stator 40 with a stator wear liner removed is illustrated according to various embodiments. Floating stator core 710 may comprise an annular component having floating stator core keys 810 extending radially inward from an inner circumference 802 of floating stator core 710. In various embodiments, each floating stator core key 810 may correspond to a stator spine key notch 820. Floating stator core 710 may be positioned such that floating stator core keys 810 fit within stator spine key notches 820. Thus, floating stator core keys 810 may contact lateral walls 822 of stator spine key notches 820 and prevent relative rotational movement between floating stator core 710 and stator carrier plate 48.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A friction disk comprising:
    a carrier plate;
    a first wear liner coupled to the carrier plate;
    a second wear liner coupled to the carrier plate; and
    a floating core located between the first wear liner and the second wear liner, wherein the floating core comprises a floating core key located within a key notch in the carrier plate.

2. The friction disk of claim 1, wherein the floating core key is configured to prevent rotational movement of the floating core relative to the carrier plate.

3. The friction disk of claim 1, wherein the floating core comprises a carbon composite.

4. The friction disk of claim 1, wherein the carrier plate comprises at least one of silicon carbide, a silicon carbide composite, and titanium.

5. The friction disk of claim 1, wherein the friction disk comprises at least one of a rotor and a stator for an aircraft braking system.

6. An aircraft brake system comprising:
    a rotor comprising a rotor carrier plate, a first rotor wear liner, a second rotor wear liner, and a floating rotor core located between the first rotor wear liner and the second rotor wear liner, wherein the floating rotor core is located radially inward of the rotor carrier plate; and
    a stator comprising a stator carrier plate, a first stator wear liner, a second stator wear liner, and a floating stator core located between the first stator wear liner and the second stator wear liner.

7. The aircraft brake system of claim 6, wherein the floating stator core is located radially outward of the stator carrier plate.

8. The aircraft brake system of claim 6, wherein the floating rotor core comprises a floating rotor core key, and wherein the floating stator core comprises a floating stator core key.

9. The aircraft brake system of claim 6, wherein at least one of the floating rotor core and the floating stator core are configured to damp vibrations in the aircraft brake system.

10. The aircraft brake system of claim 6, wherein the floating rotor core is free to move in an axial direction between the first rotor wear liner and the second rotor wear liner.

11. The aircraft brake system of claim 6, wherein an inner surface of the floating rotor core is flush with an inner surface of the first rotor wear liner and an inner surface of the second rotor wear liner.

12. A friction disk comprising:
   a carrier plate;
   a first wear liner coupled to the carrier plate;
   a second wear liner coupled to the carrier plate; and
   a floating core located between the first wear liner and the second wear liner, wherein the floating core comprises a floating core key, wherein the floating core key is configured to prevent rotational movement of the floating core relative to the carrier plate.

13. The friction disk of claim 12, wherein the carrier plate comprises a key notch.

14. An aircraft brake system comprising:
   a rotor comprising a rotor carrier plate, a first rotor wear liner, a second rotor wear liner, and a floating rotor core located between the first rotor wear liner and the second rotor wear liner; and
   a stator comprising a stator carrier plate, a first stator wear liner, a second stator wear liner, and a floating stator core located between the first stator wear liner and the second stator wear liner, wherein the floating stator core is located radially outward of the stator carrier plate.

15. The aircraft brake system of claim 14, wherein the floating rotor core is located radially inward of the rotor carrier plate.

* * * * *